US012579390B2

(12) United States Patent
Shellhammer et al.

(10) Patent No.: US 12,579,390 B2
(45) Date of Patent: Mar. 17, 2026

(54) AMBIENT POWER ENERGIZER CONTROL

(71) Applicant: QUALCOMM Incorporated, San Diego, CA (US)

(72) Inventors: Stephen Jay Shellhammer, Ramona, CA (US); Bin Tian, San Diego, CA (US); George Cherian, San Diego, CA (US); Alfred Asterjadhi, San Diego, CA (US); Pooria Pakrooh, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 18/501,483

(22) Filed: Nov. 3, 2023

(65) Prior Publication Data

US 2025/0148233 A1 May 8, 2025

(51) Int. Cl.
*G06K 7/10* (2006.01)
*H04W 56/00* (2009.01)
*H04W 84/12* (2009.01)

(52) U.S. Cl.
CPC ...... *G06K 7/10475* (2013.01); *H04W 56/001* (2013.01); *H04W 84/12* (2013.01)

(58) Field of Classification Search
CPC . G06K 7/10475; H04W 56/001; H04W 84/12
See application file for complete search history.

(56) References Cited

U.S. PATENT DOCUMENTS

2015/0303741 A1 * 10/2015 Malik .................. H02J 50/001
307/104

* cited by examiner

*Primary Examiner* — An T Nguyen
(74) *Attorney, Agent, or Firm* — Holland & Hart LLP

(57) ABSTRACT

This disclosure provides methods, components, devices and systems for ambient power energizer control. Some aspects more specifically relate to utilizing silent periods during which an energy providing device does not transmit radio frequency (RF) energizing waveform to avoid interference. In some implementations, a reader may transmit a message to an energizer, indicating the time period during which the energizer is to refrain from transmitting the energizing waveform. The reader also may transmit a similar message to one or more tags indicating when the tags should harvest energy and monitor for wakeup signaling. A master device may send coordination information to multiple readers such that each reader and each energizer coordinates silent periods. An energizer may combine multiple patterns of silent time periods to ensure that silent time periods for different readers are aligned. The reader may dynamically trigger energizer waveform transmission.

30 Claims, 11 Drawing Sheets

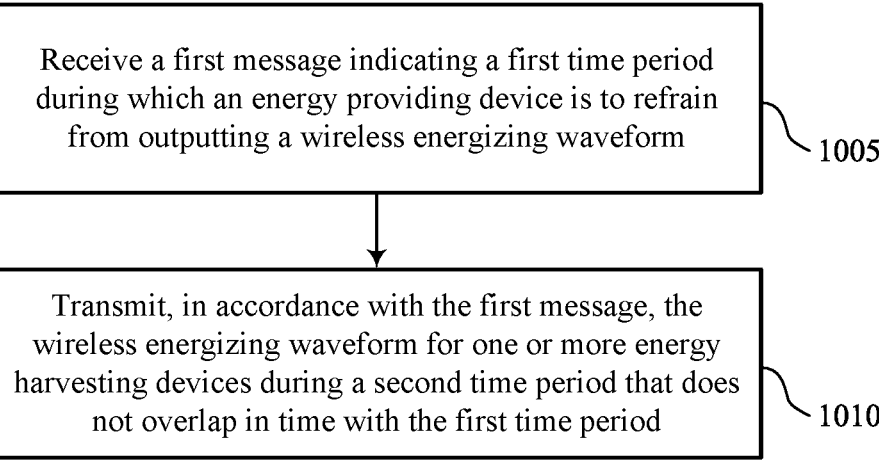

Receive a first message indicating a first time period during which an energy providing device is to refrain from outputting a wireless energizing waveform

1005

Transmit, in accordance with the first message, the wireless energizing waveform for one or more energy harvesting devices during a second time period that does not overlap in time with the first time period

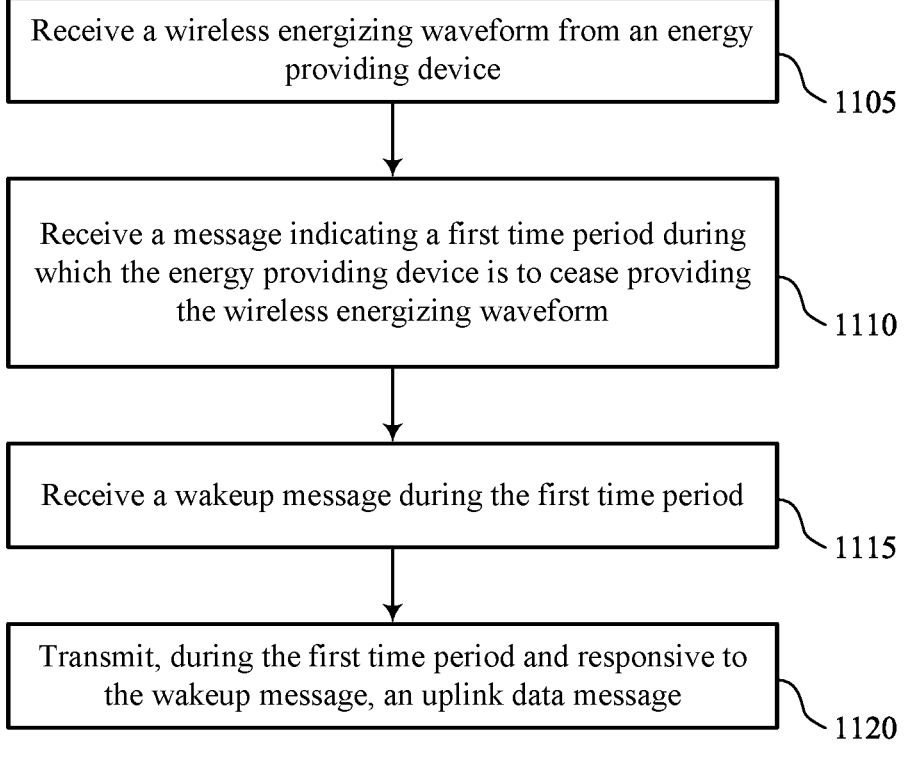

Receive a wireless energizing waveform from an energy providing device

1105

Receive a message indicating a first time period during which the energy providing device is to cease providing the wireless energizing waveform

1110

Receive a wakeup message during the first time period

1115

Transmit, during the first time period and responsive to the wakeup message, an uplink data message

AMBIENT POWER ENERGIZER CONTROL

TECHNICAL FIELD

This disclosure relates to wireless communication and, more specifically, to ambient power energizer control. Various aspects relate generally to wireless communications in an ambient power (AMP) deployment.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, an ambient power (AMP) deployment may be supported. For example, one or more energy harvesting devices (such as a tag) may not include any internal power source or battery or may have limited energy storage capabilities, and may perform energy harvesting to communicate data with a reader device. Conventional energy harvesting techniques are deficient.

SUMMARY

The systems, methods, and devices of this disclosure each have several innovative aspects, no single one of which is solely responsible for the desirable attributes disclosed herein.

On innovative aspect of the subject matter described in this disclosure can be implemented in a reader device for wireless communication. The reader device may include a processing system that includes processor circuitry and memory circuitry that stores code. The processing system may be configured to cause the reader device to transmit a message indicating a first time period during which an energy providing device is to refrain from outputting a wireless energizing waveform, transmit a wakeup message for an energy harvesting (EH) device during the first time period, and receive, from the EH device based on the wakeup message, an uplink data message during the first time period.

Another innovative aspect of the subject matter described in the disclosure can be implemented in a method for wireless communications by a reader device. The method may include transmitting a message indicating a first time period during which an energy providing device is to refrain from outputting a wireless energizing waveform, transmitting, a wakeup message during the first time period, and receiving, based on the wakeup message, an uplink data message during the first time period.

Another innovative aspect of the subject matter described in this disclosure can be implemented in a reader device for wireless communications. The reader device may include means for transmitting a message indicating a first time period during which an energy providing device is to refrain from outputting a wireless energizing waveform, means for transmitting, a wakeup message during the first time period, and means for receiving, based on the wakeup message, an uplink data message during the first time period.

Another innovative aspect of the subject matter described in this disclosure can be implemented in a non-transitory computer-readable medium storing code for wireless communication at a reader device. The code may include instructions executable by one or more processors, individually or collectively, to cause the reader device to transmit a message indicating a first time period during which an energy providing device is to refrain from outputting a wireless energizing waveform, transmit a wakeup message during the first time period, and receive, based on the wakeup message, an uplink data message during the first time period.

In some examples of the method, reader devices, and non-transitory computer-readable medium described herein, the message includes a beacon, an ambient power broadcast message, or a synchronization signal.

In some examples of the method, reader devices, and non-transitory computer-readable medium described herein, the message includes an indication of a first pattern of time durations including the first time period, the first pattern of time durations including a duration of the first time period, a periodicity of the first time period, a quantity of occurrences of the first time period during a time window, a time offset between transmission of the message and initiating the first time period, or any combination thereof.

Some examples of the method, reader devices, and non-transitory computer-readable medium described herein may further include operations, features, means, or instructions for transmitting a second message for the EH device indicating the first time period, where the wakeup message may be to be transmitted to the EH device during the first time period may be based on the second message.

Another innovative aspect of the subject matter described in this disclosure can be implemented in an energy providing device for wireless communications. The energy providing device may include a processing system that includes processor circuitry and memory circuitry that stores code. The processing system may be configured to cause the energy providing device to receive a first message indicating a first time period during which the energy providing device is to refrain from outputting a wireless energizing waveform and transmit, in accordance with the first message, the wireless energizing waveform for one or more energy harvesting devices during a second time period that does not overlap in time with the first time period.

Another innovative aspect of the subject matter described in the disclosure can be implemented in a method for wireless communications by an energy providing device. The method may include receiving a first message indicating a first time period during which the energy providing device is to refrain from outputting a wireless energizing waveform and transmitting, in accordance with the first message, the wireless energizing waveform for one or more energy harvesting devices during a second time period that does not overlap in time with the first time period.

Another innovative aspect of the subject matter described in this disclosure can be implemented in an energy providing device for wireless communications. The energy providing device may include means for receiving a first message indicating a first time period during which the energy providing device is to refrain from outputting a wireless energizing waveform and means for transmitting, in accordance with the first message, the wireless energizing waveform for one or more energy harvesting devices during a second time period that does not overlap in time with the first time period.

Another innovative aspect of the subject matter described in this disclosure can be implemented in a non-transitory computer-readable medium storing code for wireless communication at an energy providing device. The code may include instructions executable by one or more processors, individually or collectively, to cause the energy providing device to receive a first message indicating a first time period during which the energy providing device is to refrain from outputting a wireless energizing waveform and transmit, in accordance with the first message, the wireless energizing waveform for one or more energy harvesting devices during a second time period that does not overlap in time with the first time period.

In some examples of the method, energy providing devices, and non-transitory computer-readable medium described herein, the first message may be received via a wakeup radio, an enhanced wakeup radio, an ambient power wakeup radio, a radio receiver, or any combination thereof.

In some examples of the method, energy providing devices, and non-transitory computer-readable medium described herein, the first message includes a beacon, an ambient power broadcast message, or a synchronization signal.

Another innovative aspect of the subject matter described in this disclosure can be implemented in an EH) device for wireless communications. The EH device may include a processing system that includes processor circuitry and memory circuitry that stores code. The processing system may be configured to cause the EH device to receive a wireless energizing waveform from an energy providing device, receive a message indicating a first time period during which the energy providing device is to cease providing the wireless energizing waveform, receive a wakeup message during the first time period, and transmit, during the first time period and responsive to the wakeup message, an uplink data message.

Another innovative aspect of the subject matter described in the disclosure can be implemented in a method for wireless communications by an EH device. The method may include receiving a wireless energizing waveform from an energy providing device, receiving a message indicating a first time period during which the energy providing device is to cease providing the wireless energizing waveform, receiving a wakeup message during the first time period, and transmitting, during the first time period and responsive to the wakeup message, an uplink data message.

Another innovative aspect of the subject matter described in this disclosure can be implemented in an EH device for wireless communications. The EH device may include means for receiving a wireless energizing waveform from an energy providing device, means for receiving a message indicating a first time period during which the energy providing device is to cease providing the wireless energizing waveform, means for receiving a wakeup message during the first time period, and means for transmitting, during the first time period and responsive to the wakeup message, an uplink data message.

Another innovative aspect of the subject matter described in this disclosure can be implemented in a non-transitory computer-readable medium storing code for wireless communication at an EH device. The code may include instructions executable by one or more processors, individually or collectively, to cause the EH device to receive a wireless energizing waveform from an energy providing device, receive a message indicating a first time period during which the energy providing device is to cease providing the wireless energizing waveform, receive a wakeup message during the first time period, and transmit, during the first time period and responsive to the wakeup message, an uplink data message.

Some examples of the method, the EH device, and non-transitory computer-readable medium described herein may further include operations, features, means, or instructions for monitoring for the wakeup message during the first time period according to the message.

In some examples of the method, EHs, and non-transitory computer-readable medium described herein, the message includes a beacon, an ambient power broadcast message, or a synchronization signal.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 10 shows a flowchart illustrating an example process performable by or at an energy providing device that supports ambient power energizer control.

FIG. 11 shows a flowchart illustrating an example process performable by or at an energy harvesting (EH) device that supports ambient power energizer control.

Like reference numbers and designations in the various drawings indicate like elements.

DETAILED DESCRIPTION

Figure 1:
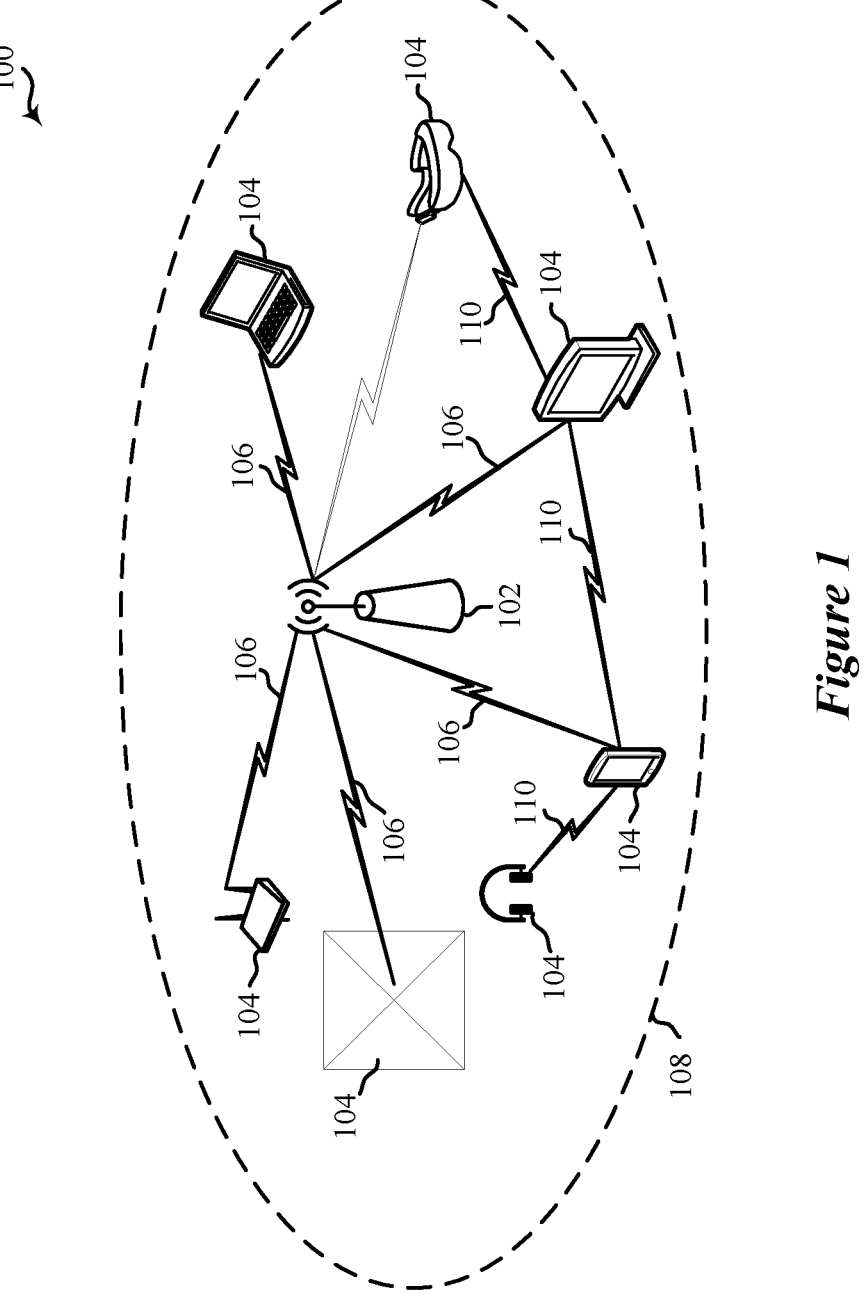
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication in an ambient power (AMP) deployment. Some aspects more specifically relate to utilizing silent periods during which an energy providing device does not transmit radio frequency (RF) energizing waveform to avoid interfering with wireless communications between a reader device and an energy harvesting device, such as a tag. In some implementations, a tag (such as a sensor, inventory tag, or a low-complexity device in an industrial or warehousing deployment, among other examples) may not include any internal power source or battery or may have limited energy storage capabilities, and may perform energy harvesting by receiving an energizing waveform transmitted by one or more energy providing devices (such as an energizer). The tags may utilize energy harvested from the energizer to receive a message (such as a wakeup message) from a reader device, and may utilize the harvested energy to transmit low-complexity uplink data.

To avoid interference between the energizing waveform, and the wireless communications, the energizer may refrain from transmitting during one or more silent periods. In some implementations, the reader may transmit a message (such as a Wi-Fi beacon, an AMP beacon, an AMP broadcast or unicast message, a new synchronization signal, among other examples) to the energizer, indicating the time period during which the energizer is to refrain from transmitting a wireless energizing waveform (e.g., refrain from outputting the wireless energizing waveform). The reader also may transmit a similar message to one or more tags indicating when the one or more tags should harvest energy and monitor for the wakeup signaling. In some examples, a single broadcast message may be transmitted to both the one or more tags and the one or more energizers, or separate signaling may be used to indicate the silent periods to one or more readers and the one or more tags, respectively. In some implementations, different energizers may operate at different times, and one or more energizers may be in communication with one or more readers. A master device (such as an AP) may send coordination information (e.g., via over-the-air signaling, or via ethernet) to multiple readers such that each reader and each energizer coordinates silent periods. In some implementations, an energizer may receive signaling from multiple readers indicating various patterns for silent periods. In such examples, the energizer may combine the patterns to ensure that an aggregated silent time period covers all received silent time periods. In some implementations, the reader may dynamically trigger energizer waveform transmission (such as may only trigger energizer waveform transmission prior to a pending wakeup signal transmission for one or more tags).

Particular aspects of the subject matter described in this disclosure can be implemented to realize one or more of the following potential advantages. In some implementations, by identifying, coordinating, or signaling specified silent time periods, the described techniques can be used to increase the reliability of communications between a reader device and one or more tags by avoiding interference. Such described techniques may further result in more effective and consistent wireless communications, more efficient use of available system resources, decreased retransmissions and decreased system latency, and improved user experience. In some cases, if the energizer does not include silent periods the energizer may cause interference to either the AMP Reader, or the AMP Tag, or both, all of the time and prevent any form of wireless communication between the AMP reader and the AMP Tag. This is particularly true when the frequency of the energizing signal is in the same frequency band as the wireless communications, but may also apply when an energizing signal is in a different frequency band.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the WLAN wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some implementations of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Puncturing is a wireless communication technique that enables a wireless communication device (such as an AP 102 or a STA 104) to transmit and receive wireless communications over a portion of a wireless channel exclusive of one or more particular subchannels (hereinafter also referred to as "punctured subchannels"). Puncturing specifically may be used to exclude one or more subchannels from the transmission of a PPDU, including the signaling of the preamble, to avoid interference from a static source, such as an incumbent system, or to avoid interference of a more dynamic nature such as that associated with transmissions by other wireless communication devices in overlapping BSSs (OBSSs). The transmitting device (such as AP 102 or STA 104) may puncture the subchannels on which there is interference and in essence spread the data of the PPDU to cover the remaining portion of the bandwidth of the channel. For example, if a transmitting device determines (such as detects, identifies, ascertains, or calculates), in association with a contention operation, that one or more 20 MHz subchannels of a wider bandwidth wireless channel are busy or otherwise not available, the transmitting device implement puncturing to avoid communicating over the unavailable subchannels while still utilizing the remaining portions of the bandwidth. Accordingly, puncturing enables a transmitting device to improve or maximize throughput, and in some instances reduce latency, by utilizing as much of the available spectrum as possible. Static puncturing in particular makes it possible to consistently use wideband channels in environments or deployments where there may be insufficient contiguous spectrum available, such as in the 5 GHz and 6 GHz bands.

In some implementations, the AP 102 or the STAs 104 of the wireless communication network 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (such as High Efficiency (HE) systems or other legacy systems). For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT and newer wireless communication protocols (such as the protocols referred to as or associated with the IEEE 802.11bn standard amendment) may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some implementations in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHz bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate sub-channel sets. For example, the 320 MHz bandwidth may be contiguous and located in the same 6 GHz band or noncontiguous and located in different bands or regions within a band (such as partly in the 5 GHz band and partly in the 6 GHz band).

In some implementations, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT enhancements such as increased bandwidth, puncturing, or refinements to carrier sensing and signal reporting mechanisms.

Transmitting and receiving devices AP 102 and STA 104 may support the use of various modulation and coding schemes (MCSs) to transmit and receive data in the wireless communication network 100 so as to optimally take advantage of wireless channel conditions, for example, to increase throughput, reduce latency, or enforce various quality of service (QoS) parameters. For example, existing technology (such as IEEE 802.11ax standard amendment protocols) supports the use of up to 1024-QAM, where a modulated symbol carries 10 bits. To further improve peak data rate, each of the AP 102 or the STA 104 may employ use of 4096-QAM (also referred to as "4k QAM"), which enables a modulated symbol to carry 12 bits. 4k QAM may enable massive peak throughput with a maximum theoretical PHY rate of 10 bps/Hz/subcarrier/spatial stream, which translates to 23 Gbps with 5/6 LDPC code (10 bps/Hz/subcarrier/ spatial stream*996*4 subcarriers*8 spatial streams/13.6 μs per OFDM symbol). The AP 102 or the STA 104 using 4096-QAM may enable a 20% increase in data rate compared to 1024-QAM given the same coding rate, thereby allowing users to obtain higher transmission efficiency.

Figure 2:
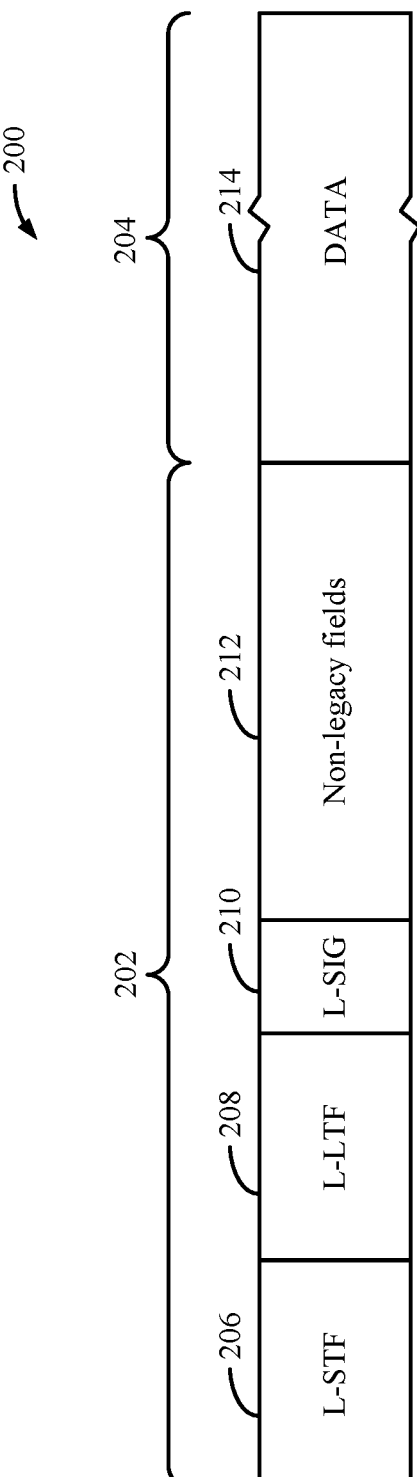
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (such as obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
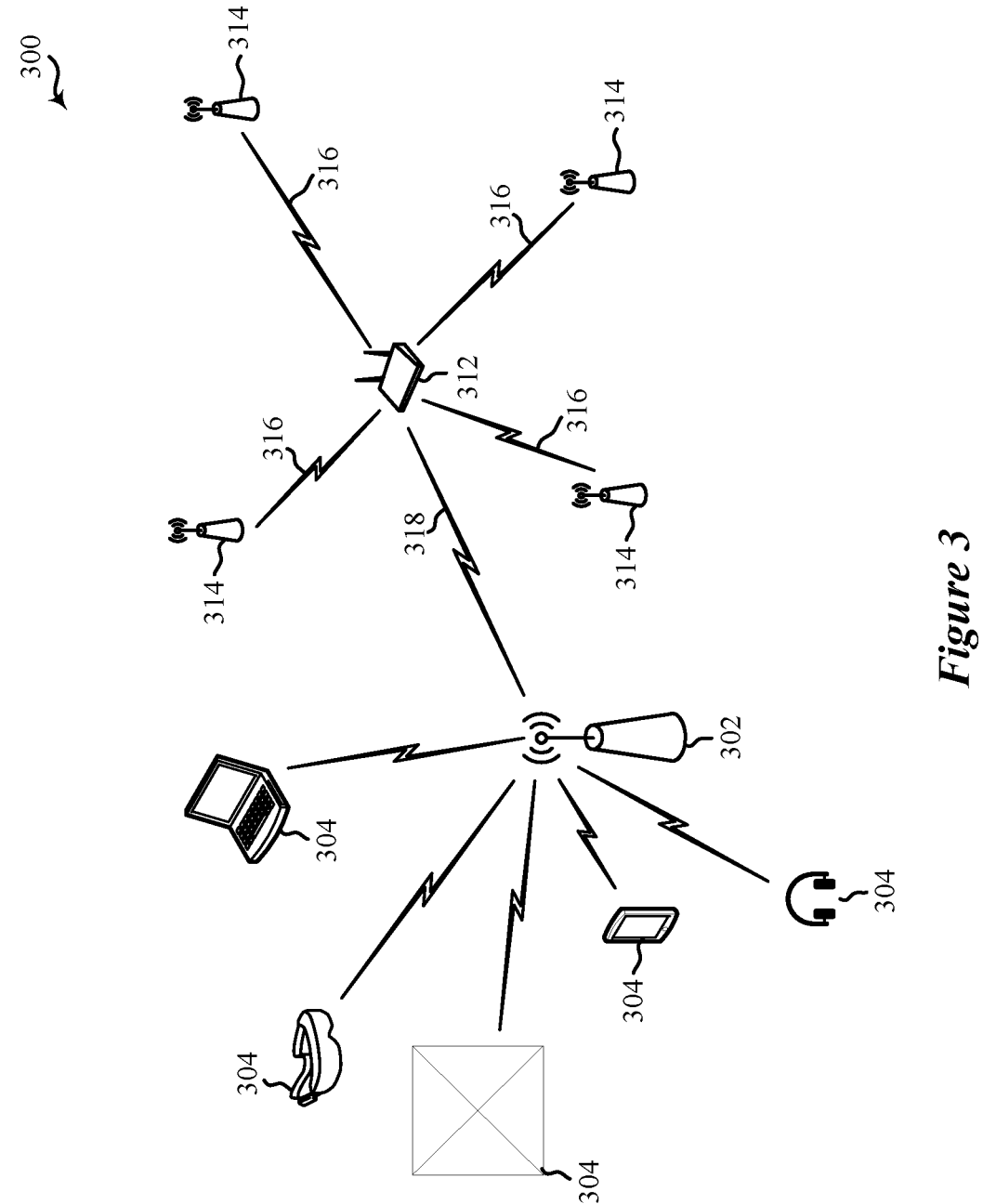
FIG. 3 shows a pictorial diagram of another example wireless communication network.

FIG. 3 shows a pictorial diagram of another example wireless communication network 300. According to some aspects, the wireless communication network 300 can be an example of a mesh network, an IoT network or a sensor network in accordance with one or more of the IEEE 802.11 family of wireless communication protocol standards (including the 802.11ah amendment). The wireless network 300 may include multiple wireless communication devices 314, APs 302, and STAs 304. The wireless communication devices 314 may represent various devices such as display devices (such as TVs, computer monitors, navigation systems, among others), music or other audio or stereo devices, remote control devices ("remotes"), printers, kitchen or other household appliances, among other examples.

In some implementations, the wireless communication devices 314 sense, measure, collect or otherwise obtain and process data and transmit such raw or processed data to an intermediate device 312 for subsequent processing or distribution. Additionally, or alternatively, the intermediate device 312 may transmit control information, digital content (such as audio or video data), configuration information or other instructions to the wireless communication devices 314. The intermediate device 312 and the wireless communication devices 314 can communicate with one another via wireless communication links 316. In some implementations, the wireless communication links 316 include Bluetooth links or other PAN or short-range communication links.

In some implementations, the intermediate device 312 also may be configured for wireless communication with other networks such as with a Wi-Fi wireless communication network 100 or a wireless (such as cellular) wide area network (WWAN), which may, in turn, provide access to external networks including the Internet. For example, the intermediate device 312 may associate and communicate, over a Wi-Fi link 318, with an AP 102 of a WLAN network, which also may serve various STAs 104. In some implementations, the intermediate device 312 is an example of a network gateway, for example, an IoT gateway. In such a manner, the intermediate device 312 may serve as an edge network bridge providing a Wi-Fi core backhaul for the IoT network including the wireless communication devices 314. In some implementations, the intermediate device 312 can analyze, preprocess and aggregate data received from the wireless communication devices 314 locally at the edge before transmitting it to other devices or external networks via the Wi-Fi link 318. The intermediate device 312 also can provide additional security for the IoT network and the data it transports.

Aspects of transmissions may vary according to a distance between a transmitter (such as an AP 102 or a STA 104) and a receiver (such as another AP 102 or STA 104). Wireless communication devices (such as the AP 102 or the STA 104) may generally benefit from having information regarding the location or proximities of the various STAs 104 within the coverage area. In some implementations, relevant distances may be determined (such as calculated or computed) using RTT-based ranging procedures. Additionally, in some implementations, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 4:
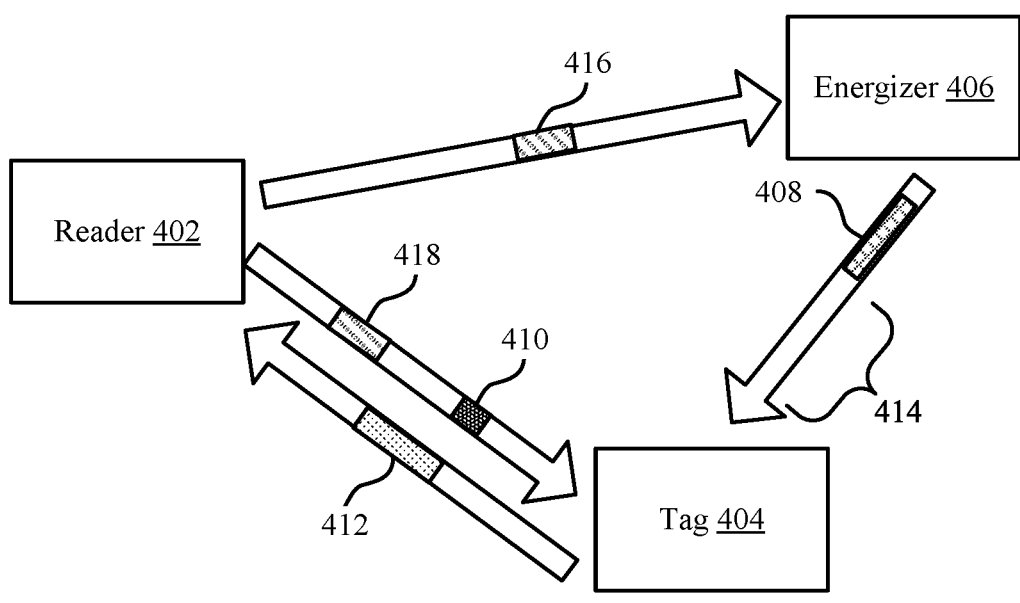
FIG. 4 shows a pictorial diagram of another wireless communication network that supports ambient power energizer control.
Figure 4:

FIG. 4 shows an example of a pictorial diagram of another wireless communication network 400 that supports ambient power energizer control. The wireless communication network 400 may implement aspects of, or be implemented by aspects of, the wireless communication network 100, the PDU 200, or the wireless communication network 300. For example, the wireless communication network 400 may include a reader device (such as a reader 402), an energy harvesting device (such as a tag 404), and an energy providing device (such as an energizer 406). The reader 402 may be an example of an AP (such as an AP 102), a STA (such as a STA 104), a handheld device, a smart phone, a specialized AMP reader, or another device.

The wireless communication network 400 may be an example of an ambient power (AMP) deployment. In such examples, the wireless communication network 400 may support low-power, low-cost AMP tags (such as a tag 404), which harvest energy (such as from the energizer 406) to support communication with an AMP reader (such as the reader 402). The energizer may provide energy to the tag 404. The energy may be provided via various methods, including RF frequency transmissions, thermal differentials, solar energy, or the like. For instance, the energizer 406 may transmit a wireless energizing waveform 408 (e.g., transmission of a continuous waveform via one or more frequency bands). The tag 404 may utilize energy harvesting circuitry (such as storing wirelessly received energy from the wireless energizing waveform in a capacitor or other energy storage device) to harvest energy from the wireless energizing waveform 408 for wireless communications with the reader 402. In some implementations, the energizer may provide energy using transmissions (such as of the energizing waveform 408) via the same band, or via multiple different bands. For example, the energizer 406 may transmit the energizing waveform 408 via a first band (such as a sub-1 GHz frequency band), and the reader 402 may communicate with the tag 404 via the first band (such as the same band, such as a sub-1 GHz frequency band), or a second band (such as a 2.4 GHz frequency band), or both.

In some implementations, the energizer 406 may be a separate device from the reader 402. For instance, the wireless communication network 400 may represent a deployment (such as an industrial deployment) in which a high quantity of tags 404 are distributed throughout a large physical space (such as a warehouse, among other examples), and a larger quantity of energizers 406 may be distributed throughout the physical area than a quantity of readers 402 (such as the reader 402 may be an AP in such examples). For instance, the energizer 406 may have a limited range, and there may be more energizers 406 than access points. In such examples, a network topology in which the energizer 406 is a separate device than the reader 402 may support techniques described herein. In some implementations, techniques described herein may be implemented in implementations in which a reader 402 and an energizer 406 are part of a same device, or are collocated, among other examples.

In some implementations, the tag 404 may include a receiver, such as a wakeup radio (WUR). The reader 402 may transmit a message 410 (such as a wakeup signal (WUS)) to the tag 404 (such as the tag 404 may receive the message 410 via the WUR). In response to receiving the WUS, the tag 404 may transmit the message 412 (such as low-complexity data via uplink) to the reader 402. For instance, if the tag 404 has information to transmit to the reader (such as pending uplink data, such as inventory information, status information, sensor information, among other examples), upon receiving the message 410, the tag 404 may utilize energy harvested from the energizer waveform 408 to transmit the message 412 to the reader 402.

In some implementations, the tag 404, the energizer 406, and the reader 402, may operate using frequency resources (such as via frequency bands) that are relatively close to each other (such as via various channels of a sub-1 GHz band). In such implementations, even if the energizer 406 transmits the energizing waveform 408 via a different channel than the channels on which the message 410 and the message 412 are communicated, the different channel may be close enough in frequency as to result in interference or jamming. In some implementations, the energizer 406 may transmit the energizing waveform at a relatively high transmit power, where the energizer signal (such as the energizing waveform 408) is very strong compared to the message 410, or the message 412. Thus (such as even if the energizer 406 transmits the energizer waveform 408 in a different band than the message 410 and the message 412), the energizer waveform 408 may cause interference in the different channel that may jam the message 410 and the message 412. That is, if the energizer waveform 408 is transmitted at the same time as the message 410, the tag 404 may not successfully receive the message 410 (and may therefore fail to transmit the uplink message 412 in response). Similarly, the energizer signal (such as the energizing waveform 408) detected at the reader 402 may be strong, and could block low-complexity uplink signaling. For instance, if the energizer waveform 408 is transmitted at the same time as the message 412, the reader 402 may fail to receive the message 412 due to interference caused by the energizer waveform. This may result in failure of the reader 402 to receive signaling from the tag 404, decreased efficiency in the wireless communication network 400, decreased communication throughput between the reader 402 and the tag 404, inefficient use of available resources, increased system latency, decreased user experience, or the like.

Techniques described herein may prevent or reduce the likelihood of the energizer signal (such as the energizing waveform 408) from blocking reception of the wireless signals at the tag 404 and the reader 402. In some implementations, the energizer 406 may stop transmission for a time period (such as one or more silent periods 414). For example, every so often (such as every few seconds) the energizer 406 may stop transmission of the energizer waveform 408 (e.g., periodically stop transmission) for the silent period 414 (such as for several milliseconds). In some implementations, the reader may autonomously determine the silent periods 414. For example, the reader may monitor the energizer signal, and may learn the period and timing of the times when the energizer 406 is silent (such as the period, duration, and timing of the silent periods 414). The reader 402 may then use the silent periods 414 for exchanging information with the tag 404 (such as, the reader 402 may transmit the message 410 triggering transmission of the message 412 during one of the silent periods 414).

In some implementations, the reader 402 may transmit a control message to indicate the silent periods 414 to the energizer 406, the tag 404, or both. For example, there may be multiple energizers 406 operating and sharing a same wireless communication channel. Even if the energizers 406 are in different channels, the energizers 406 may still block wireless reception at the tag 404, the reader 402, or both. Clocks for the various energizers 406 may drift, resulting in variation in the silent periods 414 for each energizer 406. In such examples, silent periods 414 for the various energizers 406 may not align (such as and transmission of the energizer waveform 408 may interfere with wireless communications between the reader 402 and one or more tags 404). To avoid such a scenario, the energizer 406 may be equipped with a wireless receiver. The wireless receiver may use or may be an AMP receiver, an enhanced WUR radio, a WUR and control radio, a fully capable receiver and wireless radio, a low-cost or low capability radio, a Wi-Fi receiver, or any other kind of receiver. The wireless receiver may be utilized to monitor for (such as listen to) a message 416 from the reader 402. The message may indicate timing information for the silent period or periods 414.

The message 416 may be a synchronization signal, a beacon (such as a Wi-Fi beacon, an AMP beacon, a specialized synchronization signal, or any combination thereof. In some examples, the message 416 may be used to synchronize the clocks of the various energizers 406, thereby enabling the various energizer to synchronize when one or more silent periods 414 occur. The reader 402 may also use the message 416 to control the one or more energizers 406 (such as beyond synchronization). For example, the reader 402 may instruct the energizer 406 to refrain from transmitting the energizing waveform 408 during one or more silent periods 414 (e.g., refrain from outputting the wireless energizing waveform). For instance, the reader 402 may indicate, to the energizer 406, a timing of one or more silent periods 414, a time between silent periods 414, a duration of the silent periods 414, a periodicity of the silent periods 414, a timing offset between transmission (such as or reception) of the message 416 and a first silent period 414, or any combination thereof.

In some implementations, the reader 402 also may control when the tag 404 monitors for the message 410 (such as when the tag 404 monitors for a WUS using a receiver, such as a wakeup radio). The reader 402 may synchronize wireless communications with the tag 404 (such as the message 410 and the message 412) with the silent periods 414. For instance, the reader 402 may transmit the message 418 to the tag 404. The message 418 may be similar to or may be the same as the message 416. For example, the reader 402 may indicate, via the message 418, a timing of one or more silent periods 414, a time between silent periods 414, a duration of the silent periods 414, a periodicity of the silent periods 414, a timing offset between transmission (such as or reception) of the message 416 and a first silent period 414, or any combination thereof. The message 418 may be an example of a beacon (such as a Wi-Fi beacon, an AMP beacon, a synchronization message, a dedicated AMP tag message, among other examples). In some implementations, the reader 402 may broadcast a single message (such as a single beacon, such as a Wi-Fi beacon or an AMP beacon) including the message 416, and the message 418, such that a single beacon can provide information about the silent periods 414 to one or more energizers 406 and one or more tags 404. In some implementations, the reader 402 may transmit a first message 416 (such as a first beacon or synchronization message) to the energizer 406, and may transmit a second message 418 (such as a second beacon or synchronization message) to the tag 404.

A controlling or master device may coordinate multiple readers 402 (e.g., via wired signaling, such as Wi-Fi signaling, or via a wired network, such as via ethernet), such that readers 402 control silent periods 414 for multiple (such as all) energizers 406. In some deployments, there may be multiple readers 402 (such as multiple readers) and may more energizers 406 deployed (such as around a facility). Some tags 404 may be served by one reader 402, but may be in range of another energizer 406 controlled by another reader 402 (such as at a cell edge), or at a location at which the tag 404 can detect energizing waveforms 408 from multiple energizers 406. If silent periods 414 are misaligned across energizers 406, one or multiple energizing waveforms 408 may interfere with wireless communications to and from the tag 404.

To address this issue, all readers 402 (such as all AP readers) in a system or a facility may obtain synchronization information (such as facility synchronization, master synchronization, or controlling synchronization information) from a same device in the facility. The device may be a master or advanced or enhanced AP, or may be another controlling device. The readers 402 may use the synchronization information received from such a synchronizing device to ensure that all energizers 406 in the facility share the same silent times (such as to ensure that all silent periods 414 are aligned in time for all energizers, or that all silent periods 414 overlap at least partially in time). The synchronization information from the synchronizing device may be transmitted over the air via wireless signaling, or may be transmitted via wired signaling (such as via ethernet), or a combination thereof.

In some implementations, an energizer 406 may combine multiple time duration patterns to ensure aligned (such as or at least overlapping) silent periods 414 with other energizers 406. For example, the reader 402 may set up a schedule for the energizer 406 to be silent. The schedule may be defined by a time duration pattern, which may indicate a certain periodicity, time duration of each silent period 414, timing of each silent period 414, among other examples. The schedule may be indicated via the message 416. The reader 402 may announce such a schedule via a beacon, or AMP broadcast message, among other examples, The energizer 406 may pick up the schedule by listening to the message 416. In some implementations, the energizer 406 may receive multiple messages 416 (such as indicating multiple schedules) from multiple different readers 402. In such examples, the energizer 406 may combine (such as merge) the multiple schedules, such that the energizer 406 can remain silent for all scheduled silent periods 414 (such as indicated by multiple readers 402). For example, if a first silent period 414 (such as indicated by a first reader 402) overlaps at least partially in time with a second silent period 414 (such as indicated by a second reader 402), then the energizer 406 may remain silent (such as may refrain from transmitting the energizing waveform 408) for the entirety of an aggregated silent duration including both the first silent period 414 and the second silent period 414. Similarly, if a first silent period 414 (such as indicated by a first reader 402) does not overlap in time with a second silent period 414 (such as indicated by a second reader 402), then the energizer 406 may remain silent (such as may refrain from transmitting the energizing waveform 408) during both the first silent period 414 and the second silent period 414.

In some examples, the reader 402 may dynamically trigger transmission of the energizing waveform 408. For example, in some cases, the reader 402 may not rely on regular transmissions of uplink signaling (such as the message 412) from the tag 404. In such examples, the tag 404 may not rely on constant energizing by the energizer 406. In such examples, reader 402 may occasionally (such as when the reader 402 determines to trigger an uplink transmission of the message 412) instruct the energizer 406 to transmit the energizing waveform 408. In such examples, the energizer 406 may refrain from transmitting the energizing waveform 408 until instructed otherwise by the reader 402.

When prepared to trigger a report or transmission by the tag 404, the reader 402 may transmit a message 416, which may trigger energizing by the energizer 406. The message 416 may specify how long the energizer 406 is to transmit the energizing waveform 408 (such as 60 seconds), a timing offset between reception of the message 416 and transmission of the energizing waveform 408, a quantity or duration or pattern of energizing waveforms 408, or any combination thereof. Upon transmitting the energizing waveform 408 (such as indicated by the message 416), the energizer 406 may not send the energizing waveform 408 (e.g., refrain from outputting any more RF energy) until it receives another message 416 from the reader 402 instructing the energizer 406 to do so (such as triggering another transmission of the energizing waveform 408). As soon as the energizer period ends, the reader 402 may access the tag (such as may transmit the message 410, triggering transmission of the uplink message 412). In some implementations, the tag 404 may automatically monitor for the message 410 upon detecting the energizing waveform 408 (such as and performing energy harvesting). In some implementations, tag 404 may receive the message 418 (such as a separate message from the message 416 or a broadcast message including the message 416), which may indicate that the reader 402 has triggered energy harvesting by the energizer 406, that the tag 404 is to perform energy harvesting based thereon, that the tag 404 is to monitor for the message 410, or any combination thereof.

Figure 5:
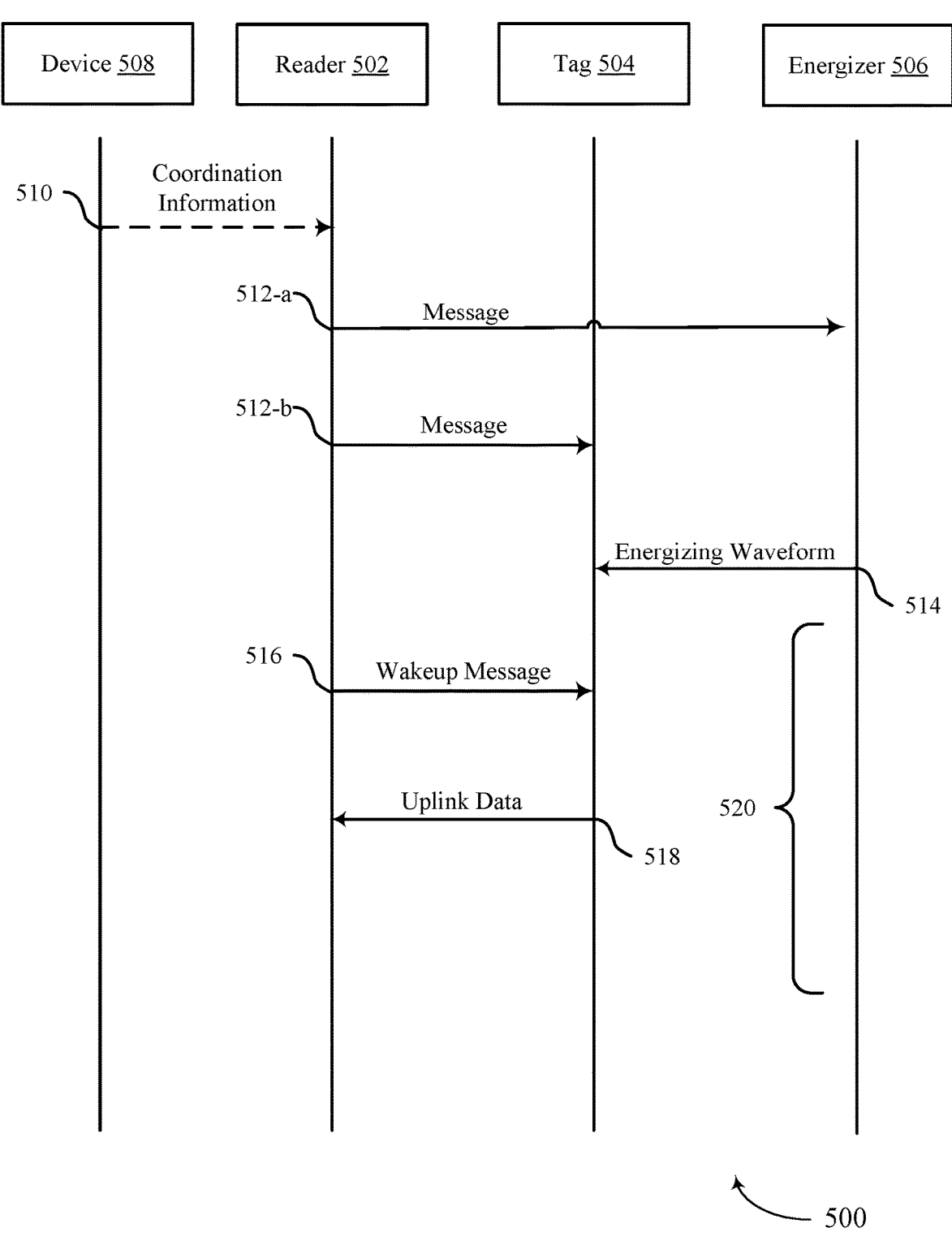
FIG. 5 shows an example of a process flow that supports ambient power energizer control.

FIG. 5 shows an example of a process flow 500 that supports ambient power energizer control. Process flow 500 may implement aspects of, or be implemented by aspects of, the wireless communication network 100, the PDU 200, the wireless communication network 300, or the wireless communication network 400. For example, the process flow 500 may include a reader 502, a tag 504, an energizer 506, and a device 508, which may be examples of corresponding devices described with reference to FIGS. 1-4.

At 512, the reader 502 may transmit a message indicating a first time period 520 (such as a silent period 414 as described with reference to FIG. 4) during which an energy providing device (such as, the energizer 506) is to refrain from outputting a wireless energizing waveform. In some implementations, the message may be a beacon (such as a Wi-Fi beacon, an AMP beacon, among other examples), a dedicated synchronization message or synchronization signal, or the like. The message may include an indication of a first pattern of time durations including the first time period 520. The first pattern of time durations may include a duration of the first time period 520, a periodicity of the first time period 520, a quantity of occurrences of the first time period 520 during a time window, a time offset between transmission of the message and initiating the first time period 520, or any combination thereof. The energizer 506 may refrain from transmitting an energizing waveform during the time period 520.

In some implementations, the reader 502 may transmit a second message to an energy harvesting device (such as the tag 504). For example, the reader 502 may transmit a first message (such as a first beacon or synchronization signal) at 512-*a*, and may transmit a second message (such as a second beacon or synchronization signal) at 512-*b*. In some implementations, the reader 502 may transmit a single broadcast message at 502 (such as including a single message indicating the time period 520, the pattern of time duration, among other examples) for reception by both the energizer 506 (such as at 512-*a*) and the tag 504 (such as at 512-*b*).

The energizer 506 may receive the message (such as at 512-*a*) via a receiver. The receiver may be a wakeup radio, an enhanced wakeup radio, and AMP wakeup radio, a radio receiver, or any combination thereof. The radio at the energizer 506 may be capable of receiving wakeup signaling, control signaling, among other examples. The energizer 506 may transmit the energizing waveform at 514. For example, the energizer 506 may continuously transmit energizing waveform 514, but may stop transmitting the energizing waveform for each silent time period 520 indicated by the message at 512-*a*.

The reader 502 and the tag 504 may communicate during the silent time period 520. For example, the reader 502 may transmit a message (such as a wakeup message) at 516. The tag 504 may receive the wakeup message using energy harvested from transmission of the energizing waveform at 514. The wakeup message may trigger the tag 504 to wake up and transmit data (e.g., low-complexity uplink data) at 518 (such as during the time period 520).

In some implementations, a synchronizing device (such as the device 508) may coordinate configuration of the time period 520 across multiple devices (such as to ensure aligned silent periods 520 across all energizers of multiple deployed energizers 506). For instance, at 510, the reader 502 may receive (such as directly or indirectly from the device 508) coordination information. The device 508 may transmit the coordination information (such as wirelessly, via wired communication, directly, via broadcast, among other examples) to multiple readers 502. The coordination information received from the controlling device 508 may include information regarding the time period 520, such that each reader 502 that receives the coordination information may control one or more energizers 506 such that the time period 520 is the same, or at least partially overlapping, for each energizer 506 served by each reader 502.

In some implementations, the reader 502 may dynamically trigger transmission of the energizing waveform 514. For example, the message transmitted at 512-*a* may indicate that the energizer 506 is to transmit the energizing waveform at 514. In such examples, the message 512-*a* may indicate a second time period, during which the energizer 506 is to transmit the energizing waveform at 514 (such as a quantity of seconds). In such examples, the message received at 512-*a* may indicate an offset between reception of the first message and initiation of the second time period, a duration of the second time period, a periodicity of the second time period, or any combination thereof. The energizer 506 may continuously transmit the energizing waveform at 514 according to the message received at 512-*a*, and may refrain from transmitting the energizing waveform upon expiration of the second time period (such as until another message from the reader 502 indicates that the energizer 506 is to transmit the energizing waveform again).

In some implementations, the energizer 506 may receive the message at 512-*a* from the reader 502, and may receive a second message from another energizer 506. The second message may indicate a different pattern of silent time periods 520 than the first message. In such examples, the energizer 506 may maintain silence (such as may refrain from transmitting the energizing waveform) in accordance with a merged pattern of time durations corresponding to a first pattern of time durations indicated in the first message and the second pattern of time durations. The first time period of the first pattern of time durations and a second time period of the second pattern of time durations may at least partially overlap in time.

Figure 6:
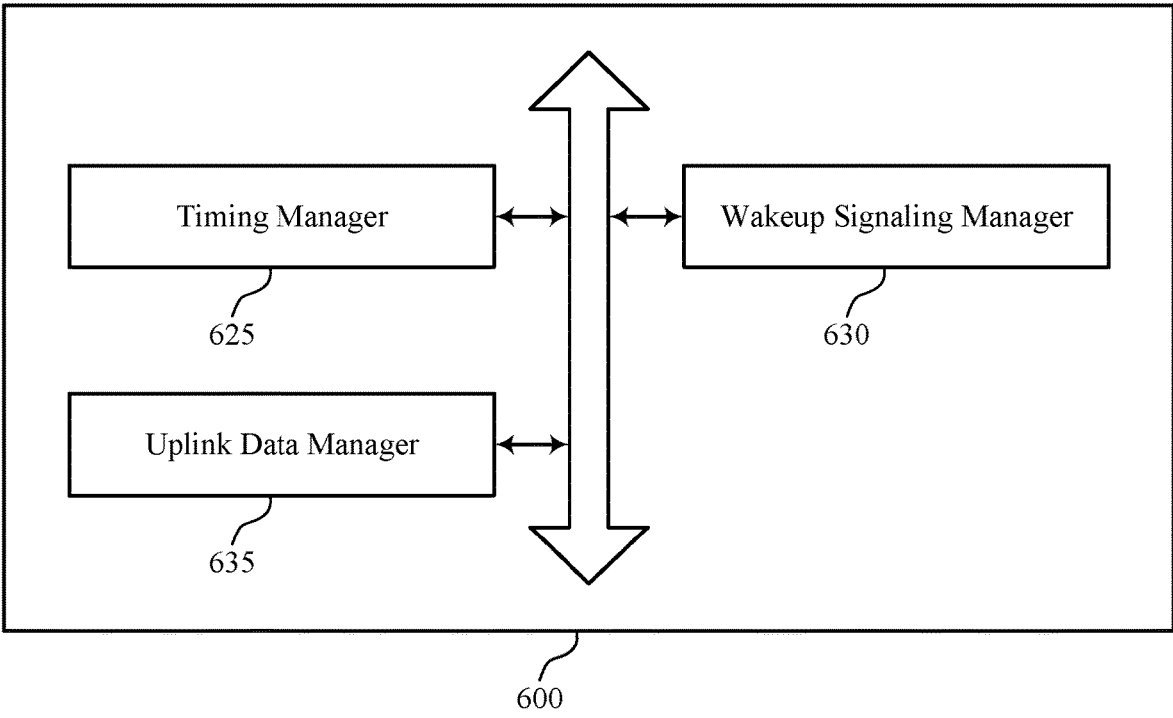
FIG. 6 shows a block diagram of an example wireless communication device that supports ambient power energizer control.

FIG. 6 shows a block diagram of an example wireless communication device 600 that supports ambient power energizer control. In some implementations, the wireless communication device 600 is configured to perform the process 900 described with reference to FIG. 9. The wireless communication device 600 may include one or more chips, SoCs, chipsets, packages, components or devices that individually or collectively constitute or include a processing system. The processing system may interface with other components of the wireless communication device 600, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 600 may transmit the information output from the chip. In such an example, the second interface may refer to an interface between the processing system of the chip and a reception component, such that the wireless communication device 600 may receive information that is then passed to the processing system. In some such examples, the first interface also may obtain information, such as from the transmission component, and the second interface also may output information, such as to the reception component.

The processing system of the wireless communication device 600 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems.

The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, the wireless communication device 600 can configurable or configured for use in an AP, such as the AP 102 described with reference to FIG. 1, a STA, such as the STA 104 described with reference to FIG. 1, or another wireless device described with reference to FIGS. 4-5. In some other examples, the wireless communication device 600 can be an AP that includes such a processing system and other components including multiple antennas. The wireless communication device 600 is capable of transmitting and receiving wireless communications in the form of, for example, wireless packets. For example, the wireless communication device 600 can be configurable or configured to transmit and receive packets in the form of physical layer PPDUs and MPDUs conforming to one or more of the IEEE 802.11 family of wireless communication protocol standards. In some other examples, the wireless communication device 600 can be configurable or configured to transmit and receive signals and communications conforming to one or more 3GPP specifications including those for 5G NR or 6G. In some implementations, the wireless communication device 600 also includes or can be coupled with one or more application processors which may be further coupled with one or more other memories. In some implementations, the wireless communication device 600 further includes at least one external network interface coupled with the processing system that enables communication with a core network or backhaul network that enables the wireless communication device 600 to gain access to external networks including the Internet.

The wireless communication device 600 includes a timing manager 625, a wakeup signaling manager 630, and an uplink data manager 635. Portions of one or more of the timing manager 625, the wakeup signaling manager 630, and the uplink data manager 635 may be implemented at least in part in hardware or firmware. For example, one or more of the timing manager 625, the wakeup signaling manager 630, and the uplink data manager 635 may be implemented at least in part by at least a processor or a modem. In some implementations, portions of one or more of the timing manager 625, the wakeup signaling manager 630, and the uplink data manager 635 may be implemented at least in part by a processor and software in the form of processor-executable code stored in memory.

The wireless communication device 600 may support wireless communications in accordance with examples as disclosed herein. The timing manager 625 is configurable or configured to transmit a message indicating a first time period during which an energy providing device is to refrain from outputting a wireless energizing waveform. The wakeup signaling manager 630 is configurable or configured to transmit a wakeup message for an EH device during the first time period. The uplink data manager 635 is configurable or configured to receive, based on the wakeup message, an uplink data message during the first time period.

In some implementations, the message include a beacon, an ambient power broadcast message, or a synchronization signal.

In some implementations, the message include an indication of a first pattern of time durations including the first time period, the first pattern of time durations including a duration of the first time period, a periodicity of the first time period, a quantity of occurrences of the first time period during a time window, a time offset between transmission of the message and initiating the first time period, or any combination thereof.

In some implementations, the timing manager 625 is configurable or configured to transmit a second message for the EH device indicating the first time period, where the wakeup message is to be transmitted to the EH device during the first time period is based on the second message.

In some implementations, a broadcast message includes the message for the reader device and the second message for a set of multiple EH devices including the EH device.

In some implementations, the timing manager 625 is configurable or configured to receive, from a controlling device corresponding to a set of multiple reader devices including the reader device, synchronization information, where the first time period is the same for each of the set of multiple reader devices according to the synchronization information.

In some implementations, the message include an indication of a second time period during which the energy providing device is to resume output of the wireless energizing waveform.

In some implementations, the message indicates an offset between transmission of the message and a beginning of the second time period, a duration of the second time period, a periodicity of the second time period, or any combination thereof.

In some implementations, transmission of the wakeup message during the first time period occurs at least a threshold amount of time after a beginning of the second time period.

In some implementations, the message includes an indication that the first time period continues until instructed by the reader device to resume output of the wireless energizing waveform.

Figure 7:
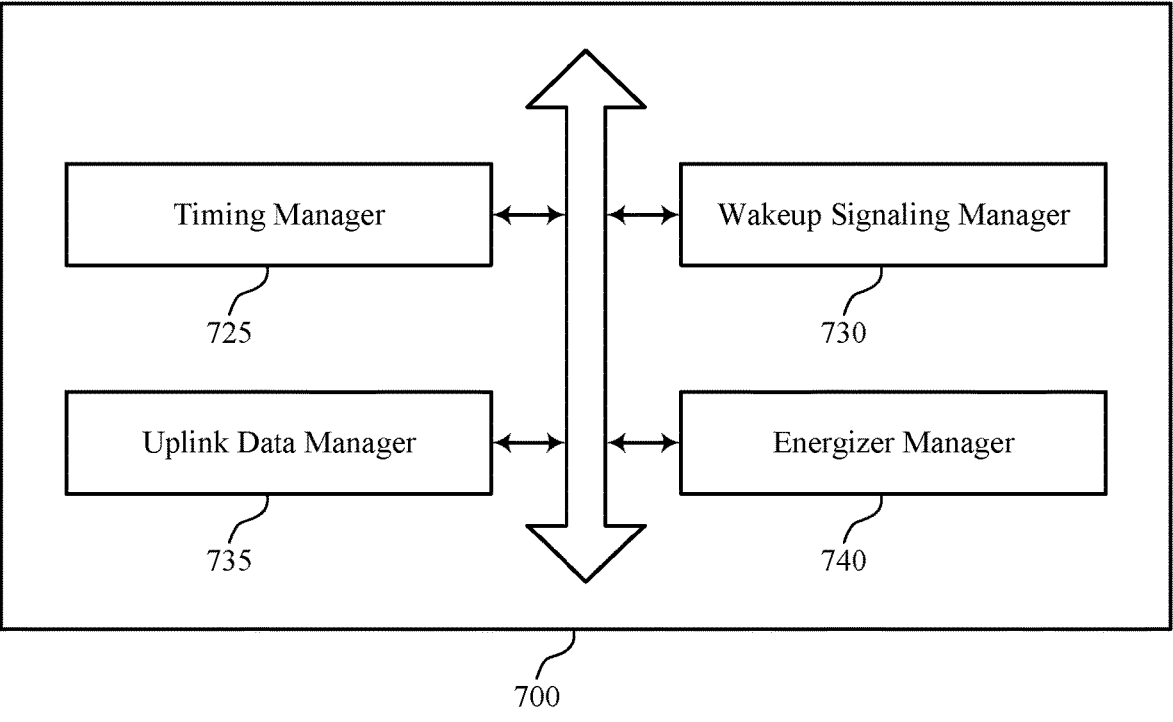
FIG. 7 shows a block diagram of an example wireless communication device that supports ambient power energizer control.

FIG. 7 shows a block diagram of an example wireless communication device 700 that supports ambient power energizer control. In some implementations, the wireless communication device 700 is configured to perform the process 900 described with reference to FIG. 9. The wireless communication device 700 may include one or more chips, SoCs, chipsets, packages, components or devices that individually or collectively constitute or include a processing system. The processing system may interface with other components of the wireless communication device 700, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 700 may transmit the information output from the chip. In such an example, the second interface may refer to an interface between the processing system of the chip and a reception component, such that the wireless communication device 700 may receive information that is then passed to the processing system. In some such examples, the first interface also may obtain information, such as from the transmission component, and the second interface also may output information, such as to the reception component.

The processing system of the wireless communication device 700 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, the wireless communication device 700 can configurable or configured for use in a STA, such as the STA 104 described with reference to FIG. 1. In some other examples, the wireless communication device 700 can be a STA that includes such a processing system and other components including multiple antennas. The wireless communication device 700 is capable of transmitting and receiving wireless communications in the form of, for example, wireless packets. For example, the wireless communication device 700 can be configurable or configured to transmit and receive packets in the form of physical layer PPDUs and MPDUs conforming to one or more of the IEEE 802.11 family of wireless communication protocol standards. In some other examples, the wireless communication device 700 can be configurable or configured to transmit and receive signals and communications conforming to one or more 3GPP specifications including those for 5G NR or 6G. In some implementations, the wireless communication device 700 also includes or can be coupled with one or more application processors which may be further coupled with one or more other memories. In some implementations, the wireless communication device 700 further includes a user interface (UI) (such as a touchscreen or keypad) and a display, which may be integrated with the UI to form a touchscreen display that is coupled with the processing system. In some implementations, the wireless communication device 700 may further include one or more sensors such as, for example, one or more inertial sensors, accelerometers, temperature sensors, pressure sensors, or altitude sensors, that are coupled with the processing system.

The wireless communication device 700 includes a timing manager 725, a wakeup signaling manager 730, an uplink data manager 735, and an energizer manager 740. Portions of one or more of the timing manager 725, the wakeup signaling manager 730, the uplink data manager 735, and the energizer manager 740 may be implemented at least in part in hardware or firmware. For example, one or more of the timing manager 725, the wakeup signaling manager 730, the uplink data manager 735, and the energizer manager 740 may be implemented at least in part by at least a processor or a modem. In some implementations, portions of one or more of the timing manager 725, the wakeup signaling manager 730, the uplink data manager 735, and the energizer manager 740 may be implemented at least in part by a processor and software in the form of processor-executable code stored in memory.

The wireless communication device 700 may support wireless communications in accordance with examples as disclosed herein. The timing manager 725 is configurable or configured to transmit a message indicating a first time period during which an energy providing device is to refrain from outputting a wireless energizing waveform. The wakeup signaling manager 730 is configurable or configured to transmit a wakeup message during the first time period. The uplink data manager 735 is configurable or configured to receive, based on the wakeup message, an uplink data message during the first time period.

In some implementations, the message includes a beacon, an ambient power broadcast message, or a synchronization signal.

In some implementations, the message include an indication of a first pattern of time durations including the first time period, the first pattern of time durations including a duration of the first time period, a periodicity of the first time period, a quantity of occurrences of the first time period during a time window, a time offset between transmission of the message and initiating the first time period, or any combination thereof.

In some implementations, the timing manager 725 is configurable or configured to transmit a second message for the EH device indicating the first time period, where the wakeup message is to be transmitted to the EH device during the first time period is based on the second message.

In some implementations, a broadcast message includes the message for the reader device and the second message for a set of multiple EH devices including the EH device.

In some implementations, the timing manager 725 is configurable or configured to receive, from a controlling device corresponding to a set of multiple reader devices including the reader device, synchronization information, where the first time period is the same for each of the set of multiple reader devices according to the synchronization information.

In some implementations, the message includes an indication of a second time period during which the energy providing device is to resume output of the wireless energizing waveform.

In some implementations, the message indicates an offset between transmission of the message and a beginning of the second time period, a duration of the second time period, a periodicity of the second time period, or any combination thereof.

In some implementations, transmission of the wakeup message during the first time period occurs at least a threshold amount of time after a beginning of the second time period.

In some implementations, the message includes an indication that the first time period continues until instructed by the reader device to resume output of the wireless energizing waveform.

Additionally, or alternatively, the wireless communication device 700 may support wireless communications in accordance with examples as disclosed herein. In some implementations, the timing manager 725 is configurable or configured to receive a first message indicating a first time period during which an energy providing device is to refrain from outputting a wireless energizing waveform. The energizer manager 740 is configurable or configured to transmit, in accordance with the first message, the wireless energizing waveform for one or more energy harvesting devices during a second time period that does not overlap in time with the first time period.

In some implementations, the first message be received via a wakeup radio, an enhanced wakeup radio, an ambient power wakeup radio, a radio receiver, or any combination thereof.

In some implementations, the first message includes a beacon, an ambient power broadcast message, or a synchronization signal.

In some implementations, the first message include an indication of a first pattern of time durations including the first time period, the first pattern of time durations including a duration of the first time period, a periodicity of the first time period, a quantity of occurrences of the first time period during a time window, a time offset between transmission of the first message and initiating the first time period, or any combination thereof.

In some implementations, the timing manager 725 is configurable or configured to receive a second message from a second reader device, the second message including an indication of a second pattern of time durations during which an energy providing device is to refrain from transmitting the wireless energizing waveform, where the wireless energizing waveform is transmitted in accordance with a merged pattern of time durations corresponding to a first pattern of time durations indicated in the first message and the second pattern of time durations, and where the first time period of the first pattern of time durations and a second time period of the second pattern of time durations at least partially overlap in time.

In some implementations, the wireless energize waveform is continuously transmitted during the second time period.

In some implementations, the first message includes an indication of the second time period during which the energy providing device is to resume output of the wireless energizing waveform.

In some implementations, the first message includes an offset between reception of the first message and initiation of the second time period, a duration of the second time period, a periodicity of the second time period, or any combination thereof.

Figure 8:
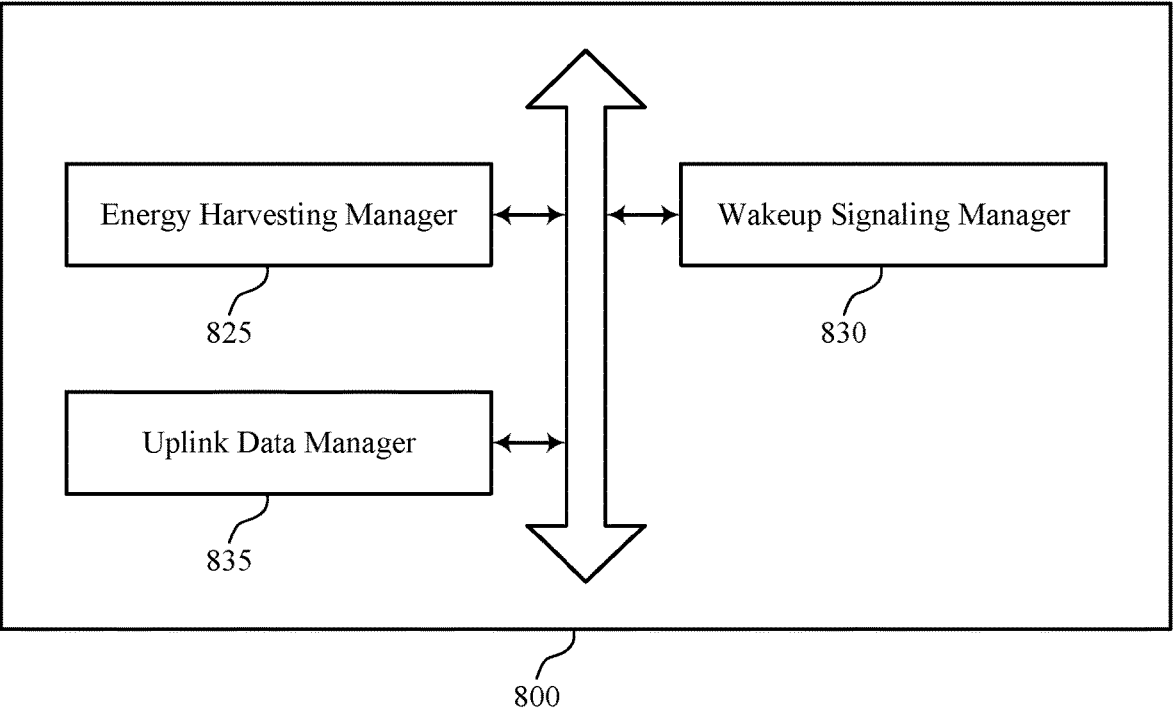
FIG. 8 shows a block diagram of an example wireless communication device that supports ambient power energizer control.

FIG. 8 shows a block diagram of an example wireless communication device 800 that supports ambient power energizer control. In some implementations, the wireless communication device 800 is configured to perform the process 1000 described with reference to FIG. 10. The wireless communication device 800 may include one or more chips, SoCs, chipsets, packages, components or devices that individually or collectively constitute or include a processing system. The processing system may interface with other components of the wireless communication device 800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 800 may transmit the information output from the chip. In such an example, the second interface may refer to an interface between the processing system of the chip and a reception component, such that the wireless communication device 800 may receive information that is then passed to the processing system. In some such examples, the first interface also may obtain information, such as from the transmission component, and the second interface also may output information, such as to the reception component.

The processing system of the wireless communication device 800 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, the wireless communication device 800 can configurable or configured for use in a STA, such as the STA 104 described with reference to FIG. 1, or an AP, such as an AP 102 described with reference to FIG.

1, or another device as described with reference to FIGS. 4-5. In some other examples, the wireless communication device 800 can be a STA that includes such a processing system and other components including multiple antennas. The wireless communication device 800 is capable of transmitting and receiving wireless communications in the form of, for example, wireless packets. For example, the wireless communication device 800 can be configurable or configured to transmit and receive packets in the form of physical layer PPDUs and MPDUs conforming to one or more of the IEEE 802.11 family of wireless communication protocol standards. In some other examples, the wireless communication device 800 can be configurable or configured to transmit and receive signals and communications conforming to one or more 3GPP specifications including those for 5G NR or 6G. In some implementations, the wireless communication device 800 also includes or can be coupled with one or more application processors which may be further coupled with one or more other memories. In some implementations, the wireless communication device 800 further includes a user interface (UI) (such as a touchscreen or keypad) and a display, which may be integrated with the UI to form a touchscreen display that is coupled with the processing system. In some implementations, the wireless communication device 800 may further include one or more sensors such as, for example, one or more inertial sensors, accelerometers, temperature sensors, pressure sensors, or altitude sensors, that are coupled with the processing system.

The wireless communication device 800, or various components thereof, may be an example of means for performing various aspects of ambient power energizer control as described herein. For example, the wireless communication device 800 may include an energy harvesting manager 825, a wakeup signaling manager 830, an uplink data manager 835, or any combination thereof. Each of these components, or components or subcomponents thereof (such as one or more processors, one or more memories), may communicate, directly or indirectly, with one another (such as via one or more buses).

The wireless communication device 800 may support wireless communications in accordance with examples as disclosed herein. The energy harvesting manager 825 is configurable or configured to receive a wireless energizing waveform from an energy providing device. In some implementations, the energy harvesting manager 825 is configurable or configured to receive a message indicating a first time period during which the energy providing device is to cease providing the wireless energizing waveform. The wakeup signaling manager 830 is configurable or configured to receive a wakeup message during the first time period. The uplink data manager 835 is configurable or configured to transmit, during the first time period and responsive to the wakeup message, an uplink data message.

In some implementations, the wakeup signaling manager 830 is configurable or configured to monitor for the wakeup message during the first time period according to the message.

In some implementations, the message includes a beacon, an ambient power broadcast message, or a synchronization signal.

In some implementations, the message include an indication of a first pattern of time durations including the first time period, the first pattern of time durations including a duration of the first time period, a periodicity of the first time period, a quantity of occurrences of the first time period during a time window, a time offset between transmission of the message and initiating the first time period, or any combination thereof.

In some implementations, the message be received from a reader device via a wakeup radio, an enhanced wakeup radio, an ambient power wakeup radio, a radio receiver, or any combination thereof.

Figure 9:
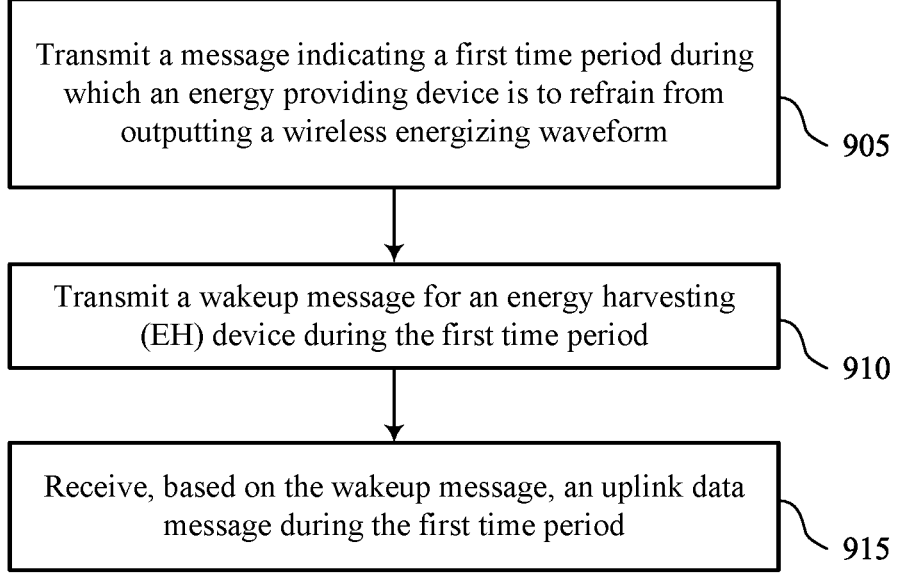
FIG. 9 shows a flowchart illustrating an example process performable by or at a reader device that supports ambient power energizer control.

FIG. 9 shows a flowchart illustrating an example process 900 performable by or at a reader device that supports ambient power energizer control. The operations of the process 900 may be implemented by a reader device or its components as described herein. For example, the process 900 may be performed by a wireless communication device, such as the wireless communication device 600 described with reference to FIG. 6, operating as or within a wireless AP or a wireless STA. In some implementations, the process 900 may be performed by a wireless AP or a wireless STA, such as one of the APs 102 or the STAs 104 described with reference to FIG. 1.

In some implementations, in block 905, the reader device may transmit a message indicating a first time period during which an energy providing device is to refrain from outputting a wireless energizing waveform. The operations of block 905 may be performed in accordance with examples as disclosed herein. In some implementations, aspects of the operations of block 905 may be performed by a timing manager 625 or a timing manager 725 as described with reference to FIGS. 6 and 7.

In some implementations, in block 910, the reader device may transmit a wakeup message for an EH device during the first time period. The operations of block 910 may be performed in accordance with examples as disclosed herein. In some implementations, aspects of the operations of block 910 may be performed by a wakeup signaling manager 630 or a wakeup signaling manager 730 as described with reference to FIGS. 6 and 7.

In some implementations, in block 915, the reader device may receive, based on the wakeup message, an uplink data message during the first time period. The operations of block 915 may be performed in accordance with examples as disclosed herein. In some implementations, aspects of the operations of block 915 may be performed by an uplink data manager 635 or an uplink data manager 735 as described with reference to FIGS. 6 and 7.

FIG. 10 shows a flowchart illustrating an example process 1000 performable by or at an energy providing device that supports ambient power energizer control. The operations of the process 1000 may be implemented by an energy providing device or its components as described herein. For example, the process 1000 may be performed by a wireless communication device, such as the wireless communication device 700 described with reference to FIG. 7, operating as or within a wireless STA. In some implementations, the process 1000 may be performed by a wireless STA, such as one of the STAs 104 described with reference to FIG. 1, or an AP, such as one of the APs 102 described with reference to FIG. 1, or another device, such as those described with reference to FIGS. 4-5.

In some implementations, in block 1005, the energy providing device may receive a first message indicating a first time period during which an energy providing device is to refrain from outputting a wireless energizing waveform. The operations of block 1005 may be performed in accordance with examples as disclosed herein. In some implementations, aspects of the operations of block 1005 may be performed by a timing manager 725 as described with reference to FIG. 7.

In some implementations, in block 1010, the energy providing device may transmit, in accordance with the first message, the wireless energizing waveform for one or more energy harvesting devices during a second time period that does not overlap in time with the first time period. The operations of block 1010 may be performed in accordance with examples as disclosed herein. In some implementations, aspects of the operations of block 1010 may be performed by an energizer manager 740 as described with reference to FIG. 7.

FIG. 11 shows a flowchart illustrating a method 1100 that supports ambient power energizer control. The operations of the method 1100 may be implemented by a wireless device or its components as described herein. For example, the operations of the method 1100 may be performed by a wireless device, such as a wireless device or its components as described herein. For example device 800 as described with reference to FIG. 8, operating as or within a STA, an AP, or any other device, such as an energy harvesting device. In some implementations, the method 1100 may be performed by a wireless STA, such as one of the STAs 104 described with reference to FIG. 1, or an AP, such as one of the APs 102 described with reference to FIG. 1, or another device, such as those described with reference to FIGS. 4-5.

At 1105, the method may include receiving a wireless energizing waveform from an energy providing device. The operations of block 1105 may be performed in accordance with examples as disclosed herein. In some implementations, aspects of the operations of 1105 may be performed by an energy harvesting manager 825 as described with reference to FIG. 8.

At 1110, the method may include receiving a message indicating a first time period during which the energy providing device is to cease providing the wireless energizing waveform. The operations of block 1110 may be performed in accordance with examples as disclosed herein. In some implementations, aspects of the operations of 1110 may be performed by an energy harvesting manager 825 as described with reference to FIG. 8.

At 1115, the method may include receiving a wakeup message during the first time period. The operations of block 1115 may be performed in accordance with examples as disclosed herein. In some implementations, aspects of the operations of 1115 may be performed by a wakeup signaling manager 830 as described with reference to FIG. 8.

At 1120, the method may include transmitting, during the first time period and responsive to the wakeup message, an uplink data message. The operations of block 1120 may be performed in accordance with examples as disclosed herein. In some implementations, aspects of the operations of 1120 may be performed by an uplink data manager 835 as described with reference to FIG. 8.

Implementation examples are described in the following numbered clauses:

Aspect 1: A method for wireless communications at a reader device, comprising: transmitting a message indicating a first time period during which an energy providing device is to refrain from outputting a wireless energizing waveform; transmitting a wakeup message for an energy harvesting (EH) device during the first time period; and receiving, based at least in part on the wakeup message, an uplink data message during the first time period.

Aspect 2: The method of aspect 1, wherein the message comprises a beacon, an ambient power broadcast message, or a synchronization signal.

Aspect 3: The method of any of aspects 1 through 2, wherein the message comprises an indication of a first pattern of time durations comprising the first time period, the first pattern of time durations comprising a duration of the first time period, a periodicity of the first time period, a quantity of occurrences of the first time period during a time window, a time offset between transmission of the message and initiating the first time period, or any combination thereof.

Aspect 4: The method of any of aspects 1 through 3, further comprising: transmitting a second message for the EH device indicating the first time period, wherein the wakeup message is to be transmitted to the EH device during the first time period is based at least in part on the second message.

Aspect 5: The method of aspect 4, wherein a broadcast message comprises the message for the reader device and the second message for a plurality of EH devices comprising the EH device.

Aspect 6: The method of any of aspects 1 through 5, further comprising: receiving synchronization information, wherein the first time period is the same for each of a plurality of reader devices according to the synchronization information.

Aspect 7: The method of any of aspects 1 through 6, wherein the message comprises an indication of a second time period during which the energy providing device is to resume output of the wireless energizing waveform.

Aspect 8: The method of aspect 7, wherein the message indicates an offset between transmission of the message and a beginning of the second time period, a duration of the second time period, a periodicity of the second time period, or any combination thereof.

Aspect 9: The method of any of aspects 7 through 8, wherein transmission of the wakeup message during the first time period occurs at least a threshold amount of time after a beginning of the second time period.

Aspect 10: The method of any of aspects 1 through 9, wherein the message comprises an indication that the first time period continues until instructed by the reader device to resume output of the wireless energizing waveform.

Aspect 11: A method for wireless communications at an energy providing device, comprising: receiving a first message indicating a first time period during which the energy providing device is to refrain from outputting a wireless energizing waveform; and transmitting, in accordance with the first message, the wireless energizing waveform for one or more energy harvesting devices during a second time period that does not overlap in time with the first time period.

Aspect 12: The method of aspect 11, wherein the first message is received from a reader device via a wakeup radio, an enhanced wakeup radio, an ambient power wakeup radio, a radio receiver, or any combination thereof.

Aspect 13: The method of any of aspects 11 through 12, wherein the first message comprises a beacon, an ambient power broadcast message, or a synchronization signal.

Aspect 14: The method of any of aspects 11 through 13, wherein the first message comprises an indication of a first pattern of time durations comprising the first time period, the first pattern of time durations comprising a duration of the first time period, a periodicity of the first time period, a quantity of occurrences of the first time period during a time window, a time offset between transmission of the first message and initiating the first time period, or any combination thereof.

Aspect 15: The method of any of aspects 11 through 14, further comprising: receiving a second message from a second reader device, the second message comprising an indication of a second pattern of time durations during which the energy providing device is to refrain from transmitting the wireless energizing waveform, wherein the wireless energizing waveform is transmitted in accordance with a merged pattern of time durations corresponding to a first pattern of time durations indicated in the first message and the second pattern of time durations, and wherein the first time period of the first pattern of time durations and a second time period of the second pattern of time durations at least partially overlap in time.

Aspect 16: The method of any of aspects 11 through 15, wherein the wireless energizing waveform is continuously transmitted during the second time period.

Aspect 17: The method of any of aspects 11 through 16, wherein the first message comprises an indication of the second time period during which the energy providing device is to resume output of the wireless energizing waveform.

Aspect 18: The method of aspect 17, wherein the first message comprises an offset between reception of the first message and initiation of the second time period, a duration of the second time period, a periodicity of the second time period, or any combination thereof.

Aspect 19: A method for wireless communications at an EH device, comprising: receiving a wireless energizing waveform; receiving a message indicating a first time period during which an energy providing device is to cease providing the wireless energizing waveform; receiving a wakeup message during the first time period; and transmitting, during the first time period and responsive to the wakeup message, an uplink data message.

Aspect 20: The method of aspect 19, further comprising: monitoring for the wakeup message during the first time period according to the message.

Aspect 21: The method of any of aspects 19 through 20, wherein the message comprises a beacon, an ambient power broadcast message, or a synchronization signal.

Aspect 22: The method of any of aspects 19 through 21, wherein the message comprises an indication of a first pattern of time durations comprising the first time period, the first pattern of time durations comprising a duration of the first time period, a periodicity of the first time period, a quantity of occurrences of the first time period during a time window, a time offset between transmission of the message and initiating the first time period, or any combination thereof.

Aspect 23: The method of any of aspects 19 through 22, wherein the message is received from a reader device via a wakeup radio, an enhanced wakeup radio, an ambient power wakeup radio, a radio receiver, or any combination thereof.

Aspect 24: A reader device for wireless communications, comprising one or more memories storing processor-executable code, and one or more processors coupled with the one or more memories and individually or collectively operable to execute the code to cause the reader device to perform a method of any of aspects 1 through 10.

Aspect 25: A reader device for wireless communications, comprising at least one means for performing a method of any of aspects 1 through 10.

Aspect 26: A non-transitory computer-readable medium storing code for wireless communications, the code comprising instructions executable by a processor to perform a method of any of aspects 1 through 10.

Aspect 27: An energy providing device for wireless communications, comprising one or more memories storing processor-executable code, and one or more processors coupled with the one or more memories and individually or collectively operable to execute the code to cause the energy providing device to perform a method of any of aspects 11 through 18.

Aspect 28: An energy providing device for wireless communications, comprising at least one means for performing a method of any of aspects 11 through 18.

Aspect 29: A non-transitory computer-readable medium storing code for wireless communications, the code comprising instructions executable by a processor to perform a method of any of aspects 11 through 18.

Aspect 30: An EH device for wireless communications, comprising one or more memories storing processor-executable code, and one or more processors coupled with the one or more memories and individually or collectively operable to execute the code to cause the EH device to perform a method of any of aspects 19 through 23.

Aspect 31: An EH device for wireless communications, comprising at least one means for performing a method of any of aspects 19 through 23.

Aspect 32: A non-transitory computer-readable medium storing code for wireless communications, the code comprising instructions executable by a processor to perform a method of any of aspects 19 through 23.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A reader device, comprising:
   one or more memories storing processor-executable code; and
   one or more processors coupled with the one or more memories and individually or collectively configured to, when executing the code, cause the reader device to:
   transmit a message indicating a first time period during which an energy providing device is to refrain from outputting a wireless energizing waveform;
   transmit a wakeup message for an energy harvesting (EH) device during the first time period; and
   receive, based at least in part on the wakeup message, an uplink data message during the first time period.

2. The reader device of claim 1, wherein the message comprises a beacon, an ambient power broadcast message, or a synchronization signal.

3. The reader device of claim 1, wherein the message comprises an indication of a first pattern of time durations comprising the first time period, the first pattern of time durations comprising a duration of the first time period, a periodicity of the first time period, a quantity of occurrences of the first time period during a time window, a time offset between transmission of the message and initiating the first time period, or any combination thereof.

4. The reader device of claim 1, wherein the one or more processors are further configured to cause the reader device to:
    transmit a second message for the EH device indicating the first time period, wherein the one or more processors configured to cause the reader device to transmit the wakeup message cause the reader device to transmit the wakeup message based at least in part on the second message.

5. The reader device of claim 4, wherein a broadcast message comprises the message for the reader device and the second message for a plurality of EH devices comprising the EH device.

6. The reader device of claim 1, wherein the one or more processors are further configured to cause the reader device to:
    receive synchronization information, wherein the first time period is the same for each of a plurality of reader devices according to the synchronization information.

7. The reader device of claim 1, wherein the message comprises an indication of a second time period during which the energy providing device is to resume output of the wireless energizing waveform.

8. The reader device of claim 7, wherein the message indicates an offset between transmission of the message and a beginning of the second time period, a duration of the second time period, a periodicity of the second time period, or any combination thereof.

9. The reader device of claim 7, wherein transmission of the wakeup message during the first time period occurs at least a threshold amount of time after a beginning of the second time period.

10. The reader device of claim 1, wherein the message comprises an indication that the first time period continues until instructed by the reader device to resume output of the wireless energizing waveform.

11. An energy providing device, comprising:
    one or more memories storing processor-executable code; and
    one or more processors coupled with the one or more memories and individually or collectively configured to, when executing the code, cause the energy providing device to:
        receive, from a reader device, a first message indicating a first time period during which the energy providing device is to refrain from outputting a wireless energizing waveform;
        receive, from a second reader device, a second message indicating a second time period during which the energy providing device is to refrain from transmitting the wireless energizing waveform; and
        transmit, in accordance with the first message and the second message, the wireless energizing waveform for one or more energy harvesting devices in accordance with a merged pattern of time durations corresponding to the first time period and the second time period.

12. The energy providing device of claim 11, wherein the first message is received from the reader device via a wakeup radio, an enhanced wakeup radio, an ambient power wakeup radio, a radio receiver, or any combination thereof.

13. The energy providing device of claim 11, wherein the first message comprises a beacon, an ambient power broadcast message, or a synchronization signal.

14. The energy providing device of claim 11, wherein the first message comprises an indication of a first pattern of time durations comprising the first time period, the first pattern of time durations comprising a duration of the first time period, a periodicity of the first time period, a quantity of occurrences of the first time period during a time window, a time offset between transmission of the first message and initiating the first time period, or any combination thereof.

15. The energy providing device of claim 11, wherein the second message comprises an indication of a second pattern of time durations during which the energy providing device is to refrain from transmitting the wireless energizing waveform, the second pattern of time durations comprising the second time period, wherein the merged pattern of time durations corresponds to to a first pattern of time durations indicated in the first message, the first pattern of time durations comprising the first time period, wherein the merged pattern of time durations corresponds to the second pattern of time durations, and wherein the first time period of the first pattern of time durations and the second time period of the second pattern of time durations at least partially overlap in time.

16. The energy providing device of claim 11, wherein the wireless energizing waveform is continuously transmitted during the second time period.

17. The energy providing device of claim 11, wherein the first message comprises an indication of the second time period during which the energy providing device is to resume output of the wireless energizing waveform.

18. The energy providing device of claim 17, wherein the first message comprises an offset between reception of the first message and initiation of the second time period, a duration of the second time period, a periodicity of the second time period, or any combination thereof.

19. An energy harvesting (EH) device, comprising:
    one or more memories storing processor-executable code; and
    one or more processors coupled with the one or more memories and individually or collectively configured to, when executing the code, cause the EH device to:
        receive a wireless energizing waveform;
        receive a message indicating a first time period during which an energy providing device is to cease providing the wireless energizing waveform;
        receive, a wakeup message during the first time period; and
        transmit, during the first time period and responsive to the wakeup message, an uplink data message.

20. The EH device of claim 19, wherein the one or more processors are further configured to cause the EH device to:
    monitor for the wakeup message during the first time period according to the message.

21. The EH device of claim 19, wherein the message comprises a beacon, an ambient power broadcast message, or a synchronization signal.

22. The EH device of claim 19, wherein the message comprises an indication of a first pattern of time durations comprising the first time period, the first pattern of time durations comprising a duration of the first time period, a periodicity of the first time period, a quantity of occurrences of the first time period during a time window, a time offset between transmission of the message and initiating the first time period, or any combination thereof.

23. The EH device of claim 19, wherein the one or more processors configured to receive the message cause the EH device to receive the message via a wakeup radio, an enhanced wakeup radio, an ambient power wakeup radio, a radio receiver, or any combination thereof.

24. A method for wireless communications at a reader device, comprising:

transmitting a message indicating a first time period during which an energy providing device is to refrain from outputting a wireless energizing waveform;

transmitting a wakeup message for an energy harvesting (EH) device during the first time period; and receiving, based at least in part on the wakeup message, an uplink data message during the first time period.

25. The method of claim 24, wherein the message comprises a beacon, an ambient power broadcast message, or a synchronization signal.

26. The method of claim 24, wherein the message comprises an indication of a first pattern of time durations comprising the first time period, the first pattern of time durations comprising a duration of the first time period, a periodicity of the first time period, a quantity of occurrences of the first time period during a time window, a time offset between transmission of the message and initiating the first time period, or any combination thereof.

27. The method of claim 24, further comprising:

transmitting a second message for the EH device indicating the first time period, wherein the wakeup message is to be transmitted to the EH device during the first time period is based at least in part on the second message.

28. The method of claim 27, wherein a broadcast message comprises the message for the reader device and the second message for a plurality of EH devices comprising the EH device.

29. The method of claim 24, further comprising:

receiving synchronization information, wherein the first time period is the same for each of a plurality of reader devices according to the synchronization information.

30. The method of claim 24, wherein the message comprises an indication of a second time period during which the energy providing device is to resume output of the wireless energizing waveform.

* * * * *